United States Patent
Suryanarayana et al.

(10) Patent No.: US 11,714,756 B2
(45) Date of Patent: Aug. 1, 2023

(54) INFORMATION HANDLING SYSTEMS AND METHODS TO IMPROVE THE SECURITY AND PERFORMANCE OF A SHARED CACHE MEMORY CONTAINED WITHIN A MULTI-CORE HOST PROCESSOR

(71) Applicant: DELL PRODUCTS L.P., Round Rock, TX (US)

(72) Inventors: Shekar Babu Suryanarayana, Bagalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 164 days.

(21) Appl. No.: 17/391,977

(22) Filed: Aug. 2, 2021

(65) Prior Publication Data
US 2023/0034837 A1 Feb. 2, 2023

(51) Int. Cl.
G06F 12/00 (2006.01)
G06F 12/084 (2016.01)
G06F 9/455 (2018.01)
G06F 9/4401 (2018.01)

(52) U.S. Cl.
CPC .......... *G06F 12/084* (2013.01); *G06F 9/4401* (2013.01); *G06F 9/45558* (2013.01); *G06F 2212/62* (2013.01)

(58) Field of Classification Search
CPC ..... G06F 3/0625; G06F 3/0653; G06F 3/0679
See application file for complete search history.

(56) References Cited

U.S. PATENT DOCUMENTS

| 10,782,993 B2 | 9/2020 | Rao et al. |
| 10,996,876 B2 | 5/2021 | Prasad et al. |
| 2008/0263345 A1* | 10/2008 | Booth ............ G06F 21/572 713/2 |
| 2019/0018774 A1* | 1/2019 | Birke ............ G06F 11/34 |
| 2020/0012501 A1* | 1/2020 | Suryanarayana ....... G06F 21/52 |

(Continued)

OTHER PUBLICATIONS

Nguyen, "Introduction to Cache Allocation Technology in the Intel Xeon Processor E5 v4 Family", Feb. 11, 2016, 5 pgs.

(Continued)

*Primary Examiner* — Shawn X Gu
*Assistant Examiner* — Mohammad S Hasan
(74) *Attorney, Agent, or Firm* — Egan, Enders & Huston LLP.

(57) ABSTRACT

Embodiments of information handling systems (IHSs) and methods are provided herein to improve the security and performance of a shared cache memory contained within a multi-core host processor. Although not strictly limited to such, the techniques described herein may be used to improve the security and performance of a shared last level cache (LLC) contained within a multi-core host processor included within a virtualized and/or containerized IHS. In the disclosed embodiments, cache security and performance are improved by using pre-boot Memory Reference Code (MRC) based cache initialization methods to create page-sized cache namespaces, which may be dynamically mapped to virtualized and/or containerized applications when the applications are subsequently booted during operating system (OS) runtime.

20 Claims, 7 Drawing Sheets

Shared Last Level Cache (LLC) 438 with Dynamic Cache Allocation (DCA) for VM/Container Application Protected Access

(56) References Cited

U.S. PATENT DOCUMENTS

2020/0019410 A1* 1/2020 Dima .................. G06F 9/44521
2020/0159543 A1* 5/2020 Novoa ................ G06F 11/0757
2021/0021619 A1* 1/2021 Smith ................. H04W 12/121

OTHER PUBLICATIONS

Wikipedia, Docker (software), Captured from Internet Jul. 15, 2021, 10 pgs.
Mikben, "File Caching-Win32 apps", Microsoft, Jan. 7, 2021, 4 pgs.
Intel, "Firmware Interface Table", BIOS Specification, Apr. 2020, 17 pgs.
Intel, "Microcode Update Guidance", Jun. 12, 2020, 6 pgs.

\* cited by examiner

INFORMATION HANDLING SYSTEMS AND METHODS TO IMPROVE THE SECURITY AND PERFORMANCE OF A SHARED CACHE MEMORY CONTAINED WITHIN A MULTI-CORE HOST PROCESSOR

FIELD

This invention relates generally to information handling systems (IHSs), and more particularly, to systems and methods that improve the security and performance of cache memory.

BACKGROUND

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling system architectures allow multiple operating systems to run on a single information handling system. This type of architecture, referred to as "virtualization," creates a software abstraction layer over the physical hardware of the IHS that allows individual hardware components—e.g., processors/processor cores, memory, storage, network interfaces, audio/video cards, USB devices, input/output devices, etc.—to be divided into multiple virtual computers, more commonly referred to as virtual machines (VMs). In a virtualized information handling system, each VM runs its own operating system (referred to as a guest OS) and behaves like an independent computer, even though the VM is running on only a portion of the physical hardware included within a single computer.

There are many reasons why virtualization is utilized in computing. To desktop users, the most common use of virtualization is to be able to run applications meant for a different operating system without having to switch computers or reboot into a different system. To the applications running on top of a virtual machine, it can appear as if they are on their own dedicated machine, where the operating system, libraries, and other programs are unique to the guest OS and unconnected to the host OS sitting below it. Virtualization also allows for isolation, which may keep applications running inside of a virtual machine safe from the processes taking place in another virtual machine on the same host. Similar to virtualization, containerization is another concept that also allows applications to be run in an isolated environment. Unlike virtual machines, containers are not full, independent machines. Instead, a container is an isolated process that shares an underlying OS kernel with the host operating system, as well as the libraries and other files needed for the execution of the applications running inside of the container.

FIG. 1 (PRIOR ART) is a conceptual block diagram illustrating various software and physical hardware components of a virtualized information handling system (IHS) 100. As shown in FIG. 1, virtualized IHS 100 includes a software layer, which is abstracted from, yet shares resources within, the physical hardware components of the IHS. In the example shown in FIG. 1, the software layer includes four virtual machines 110 (e.g., VM 1, VM 2, VM 3 and VM 4)—each VM running its own guest operating system (OS) 112 and applications 114—and a virtual machine manager (VMM) 120 (otherwise referred to as hypervisor), which coordinates the VMs 110 and serves as an interface between the VMs 110 and the underlying physical hardware. VMM/hypervisor 120 ensures each VM 110 has access to the physical resources it needs to execute, and ensures that the VMs 110 don't interfere with each other by impinging on each other's memory space or compute cycles.

Multi-tenant VMs and containers are commonplace in modern information handling systems and are often used for running many heterogenous types of applications. However, it is difficult to allocate physical hardware resources to multi-tenant VMs and containers in a way that ensures consistent performance and prioritizes key applications running within the VMs/containers. In addition, security issues often arise when multiple VMs/containers access shared memory resources, such as a last level cache (LLC) shared by the processor cores of a multi-core processor.

The physical hardware resources of virtualized IHS 100 may generally include a host processor 130, a memory controller 140 and a main memory 150, in addition to other physical hardware components typically included within an IHS. In the embodiment shown in FIG. 1, host processor 130 is a multi-core processor having a plurality of processing cores 132 (e.g., Core 1, Core 2, Core 3 and Core 4). Each processing core 132 includes one or more dedicated higher-level caches, such as L1 cache 134 and L2 cache 136, for temporarily storing data and instructions to be executed by that processing core. Host processor 130 includes a last level cache (LLC) 138, which is shared by all processing cores 132. Like other physical hardware resources, the LLC 138 may be divided amongst and shared between the plurality of VMs 110 (and/or containers) running on the individual processing cores 132.

While shared resources generally provide good performance scalability, certain VM/container applications can over-utilize the LLC 138 and reduce the performance of more important applications. For example, a "noisy neighbor" (such as, e.g., a video streaming application) running on Core 1 may consume excessive amounts of LLC 138, which is allocated on a first-come first-serve basis, and cause performance loss in a higher-priority application running, for example, on Core 2.

To help address shared memory resource concerns, the LLC 138 shown in FIGS. 1-3 uses Intel's Cache Allocation Technology (CAT) to control the amount of last level cache space that can be consumed by a virtual machine or container. The existing Cache Allocation Technology (CAT) provided by Intel introduces an intermediate construct, called Class of Service (COS), which acts as a resource control tag for grouping VMs/containers. In addition, CAT defines capacity bitmasks (CBMs), which control how much of the LLC 138 can be used by a given COS by defining fixed cache partitions for each COS. In a LLC 138 with CAT, cache partitions are statically defined and tagged to an individual processor core 132. In the example shown in FIGS. 1 and 2, cache partitions of equal size are defined for each COS and uniquely mapped to each processor core 132 and corresponding VM 110.

The existing Cache Allocation Technology provided by Intel suffers from many disadvantages. In a LLC 138 with CAT, the cache partitions cannot be dynamically defined or remapped based on VM/container application workload. The inefficient use of cache leads to a reduction in cache performance. CAT also fails to provide solutions for cache security vulnerabilities. For example, VM/container workloads may processed on a single processor core (as shown in FIG. 2), or may be spread across multiple processor cores. In the example shown in FIG. 3, VM 2 utilizes core sharing to spread workload processing across processing cores 2 and 3. Since processing core 3 is shared by VM 2 and VM 3, VM 2 has access to the portion of the LLC 138, which was statically assigned to VM 3. Unlike main memory 150 (e.g., DRAM), which may use Intel's Multi-Key Total Memory Encryption (MK TME) to encrypt its contents, the data stored within LLC 138 is not encrypted. This enables VM 2 to access and/or corrupt data, which was originally stored in the LLC 138 by VM 3.

Additional security concerns not illustrated herein may also arise in a LLC 138 that utilizes Intel's Cache Allocation Technology. In an LLC 138 with CAT, for example, external interrupts (such as, e.g., interrupts provided by pseudo PCIe drivers running on a virtual machine) may allow one virtual machine to access unencrypted data stored in the LLC 138 by another virtual machine. In addition, multi-tenant VMs/containers are vulnerable to side channel attacks on the LLC 138. In a last level cache side channel attack, one VM can be extracted by another co-resident VM using high-bandwidth, low noise side channel attacks on the LLC 138 even when the VMs are scheduled on different processing cores. Intel's Cache Allocation Technology cannot prevent cross-VM side channel attacks against LLC 138, due to the limited number of partitions CAT provides.

Thus, a need exists for improved systems and methods that improve the security and optimize the performance of the last level cache.

SUMMARY OF THE INVENTION

The following description of various embodiments of information handling systems and related methods is not to be construed in any way as limiting the subject matter of the appended claims.

Embodiments of information handling systems (IHSs) and methods are provided herein to improve the security and performance of a shared cache memory contained within a multi-core host processor. Although not strictly limited to such, the techniques described herein may be used to improve the security and performance of a shared last level cache (LLC) contained within a multi-core host processor included within a virtualized and/or containerized IHS. In the disclosed embodiments, cache security and performance are improved by using pre-boot Memory Reference Code (MRC) based cache initialization methods to create page-sized cache namespaces, which may be dynamically mapped to virtualized and/or containerized applications when the applications are subsequently booted during operating system (OS) runtime.

According to one embodiment, an information handling system (IHS) in accordance with the present disclosure may generally include a computer readable storage medium storing an operating system (OS), a computer readable memory storing boot firmware and Advanced Configuration and Power Interface (ACPI) firmware, and a host processor which is coupled to the computer readable storage medium and to the computer readable memory. The host processor may include a plurality of processing cores for running virtual machines (VMs) and/or containers, and a cache memory which is shared by the plurality of processing cores.

The boot firmware may include boot services that are executable during a pre-boot phase of the boot firmware, and the ACPI firmware may include an ACPI runtime service that is executable during OS runtime. During the pre-boot phase of the boot firmware, the host processor may execute a first boot service to create page-sized cache namespaces within the cache memory and initialize the page-sized cache namespaces within a cache page namespace table. In some embodiments, the boot firmware may further include a firmware interface table (FIT) and memory reference code (MRC), and the host processor may process the FIT during the pre-boot phase to locate and load the first boot service and the cache page namespace table stored within the MRC prior to executing the first boot service.

During OS runtime, the host processor may execute the ACPI runtime service to dynamically partition the cache memory based on VM/container application workload and map dynamically created cache partitions to the VMs/containers by assigning a number of the page-sized cache namespaces included within the cache page namespace table to each VM/container. In some embodiments, the ACPI runtime service may be further executed by the host processor to map the page-sized cache namespaces assigned to each VM/container to one or more applications running on the VM/container by assigning application namespace labels to the page-sized cache namespaces. In doing so, the application namespace labels may protect the page-sized cache namespaces assigned to each VM/container application, and prevent other VMs, containers or applications from accessing the protected page-sized cache namespaces assigned to that VM/container application.

In some embodiments, VMs/containers may register for one or more of the page-sized cache namespaces included within the cache page namespace table by providing certificates to the first boot service during the pre-boot phase. In such embodiments, the first boot service may be further executed by the host processor to store and manage the certificates received from the VMs/containers during the pre-boot phase. During OS runtime, the host processor may execute the ACPI runtime service to validate the certificates received from the VMs/containers during the pre-boot phase, and assign one or more of the page-sized cache namespaces to a given VM/container only if the certificate received from the given VM/container is validated by the ACPI runtime service.

In some embodiments, the host processor may further include cache bit model-specific registers (MSRs). In such embodiments, the host processor may execute a second boot service during the pre-boot phase to allocate memory to the cache bit MSRs and map the first boot service to the ACPI runtime service. When the VMs/containers are subsequently booted during OS runtime, the ACPI runtime service may be called and executed by the host processor to: validate certificates received from the VMs/containers during the pre-boot phase; and program the cache bit MSRs to dynamically assign cache address line bits to the VMs/containers based on the VM/container application workload, if the certificates received from the VMs/containers during the pre-boot phase are validated. In some embodiments, the ACPI runtime service may be executed by the host processor to program the cache bit MSRs, so as to assign a greater number of the cache address line bits to a VM/container having a larger application workload than a VM/container having a smaller application workload. In other embodiments, the ACPI runtime service may be executed by the host processor to program the cache bit MSRs, so as to assign a greater number of the cache address line bits to a VM/container running a prioritized application.

According to another embodiment, a computer implemented method is provided herein to improve the security and performance of a cache memory contained within a host processor included within an information handling system (IHS). The host processor may generally include a plurality of processing cores for running virtual machines (VMs) and/or containers, and the cache memory may shared by the plurality of processing cores. The computer implemented method may be performed, at least in part, by the host processor executing program instructions stored within a computer readable memory of the IHS.

For example, the computer implemented method may include executing program instructions within a first boot service during a pre-boot phase before an operating system (OS) of the IHS is loaded and running to create page-sized cache namespaces within the cache memory and initialize the page-sized cache namespaces within a cache page namespace table. In some embodiments, the computer implemented method further include processing a firmware interface table (FIT) during the pre-boot phase to locate and load the first boot service and the cache page namespace table stored within a memory reference code (MRC) prior to executing the program instructions within the first boot service.

In addition, the computer implemented method may include executing program instructions within an Advanced Configuration and Power Interface (ACPI) runtime service during OS runtime to dynamically partition the cache memory based on VM/container application workload and map dynamically created cache partitions to the VMs/containers by assigning a number of the page-sized cache namespaces included within the cache page namespace table to each VM/container. In some embodiments, the computer implemented method may include executing the ACPI runtime service during OS runtime to map the page-sized cache namespaces assigned to each VM/container to one or more applications running on the VM/container by assigning application namespace labels to the page-sized cache namespaces. In doing so, the application namespace labels may protect the page-sized cache namespaces assigned to each VM/container application, and prevent other VMs, containers or applications from accessing the protected page-sized cache namespaces assigned to that VM/container application. If a given VM/container subsequently reduces cache utilization by closing an application running on the given VM/container, the computer implemented method may further include releasing the page-sized cache namespaces mapped to the application back into the cache page namespace table to be reassigned to other VM/container applications.

In some embodiments, the computer implemented method may further include receiving certificates from one or more of the VMs/containers for cache namespace registration during the pre-boot phase. In such embodiments, the computer implemented method may further include executing the program instructions within the ACPI runtime service during OS runtime to validate the certificates received from the one or more VMs/containers during the pre-boot phase. If the certificates received from the one or more VMs/containers are validated, the computer implemented method executes the program instructions within the ACPI runtime service during OS runtime to: (a) dynamically partition the cache memory based on the VM/container application workload, (b) map the dynamically created cache partitions to each of the VMs/containers by assigning the number of the page-sized cache namespaces included within the cache page namespace table to each VM/container, and (c) map the page-sized cache namespaces assigned to each VM/container to one or more applications running on the VM/container by assigning application namespace labels to the page-sized cache namespaces.

BRIEF DESCRIPTION OF THE DRAWINGS

Other advantages of the present disclosure will become apparent upon reading the following detailed description and upon reference to the accompanying drawings in which.

Figure 1:
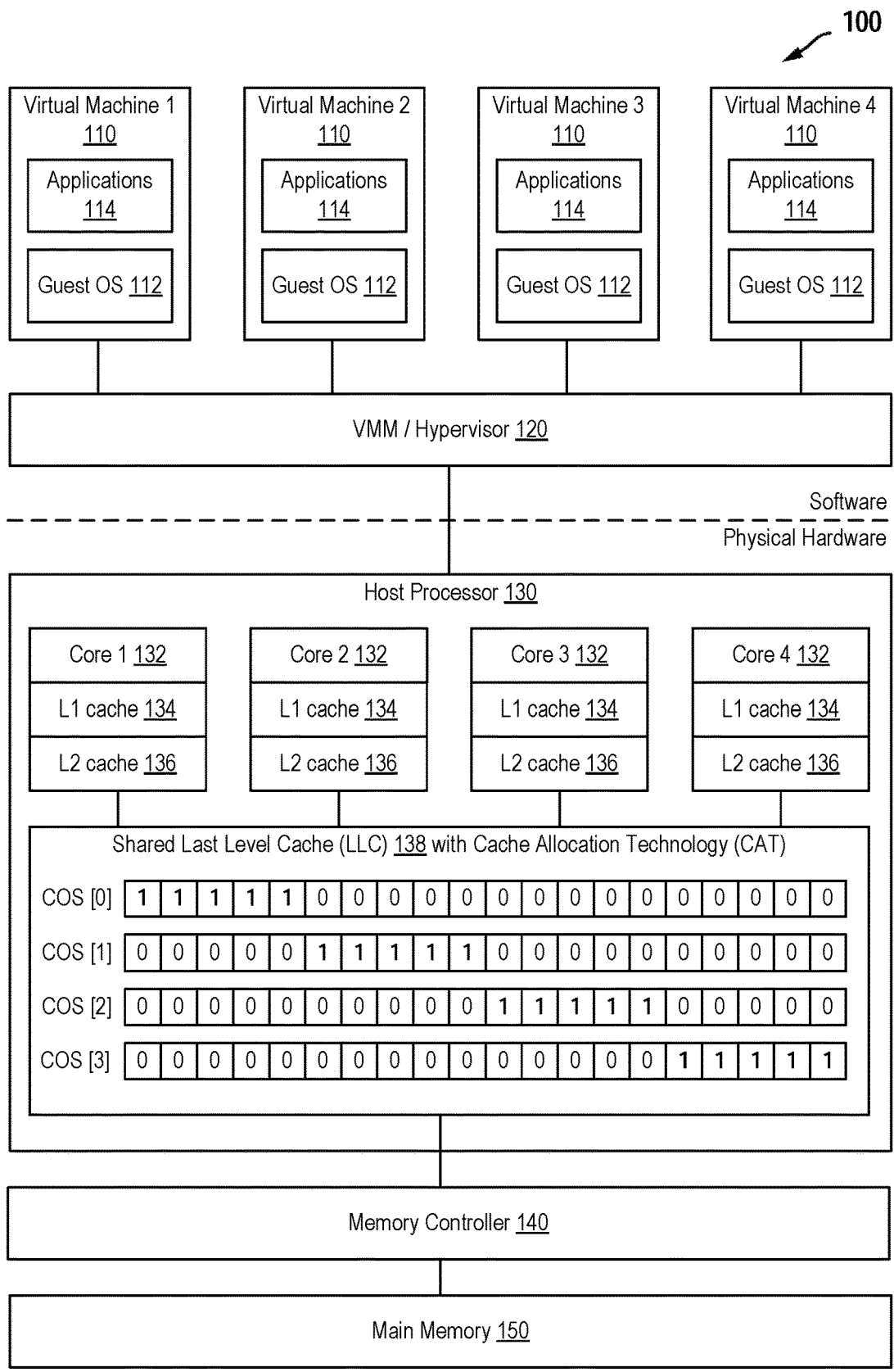
FIG. 1 (PRIOR ART) is a conceptual block diagram illustrating various software and physical hardware components of a virtualized information handling system, including an example cache architecture included within a multi-core host processor, wherein the shared last level cache (LLC) utilizes Intel's Cache Allocation Technology (CAT) to assign static cache partitions to one or more virtual machines (VMs) executed by the processing cores.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

Embodiments of information handling systems (IHSs) and methods are provided herein to improve the security and performance of a shared cache memory contained within a multi-core host processor. Although not strictly limited to such, the techniques described herein may be used to improve the security and performance of a shared last level cache (LLC) contained within a multi-core host processor included within a virtualized and/or containerized IHS. In the disclosed embodiments, cache security and performance are improved by using pre-boot Memory Reference Code (MRC) based cache initialization methods to create page-sized cache namespaces, which may be dynamically mapped to virtualized and/or containerized applications when the applications are subsequently booted during operating system (OS) runtime.

For example, a first MRC-based cache initialization method (referred to herein as a "first boot service" or a "Dynamic Cache Allocation (DCA) boot service") may be executed during a pre-boot phase of the boot firmware (e.g., during CPU initialization after the microcode is loaded during Power On Self-Test, POST) to initialize the cache namespaces and set the cache address line bits for page-level protected cache partitions. Virtual machines (VMs) and/or containers can register for one or more of the page-sized cache namespaces by providing certificates to the DCA boot service during the pre-boot phase. The DCA boot service stores the certificates received from the VMs/containers during the pre-boot phase, so that they can be validated later during OS runtime.

In addition, a second MRC-based cache initialization method (referred to herein as a "second boot service" or a "cache namespace management boot service") may be executed during the pre-boot phase to allocate memory to the CPU cache bit model-specific registers (MSRs) and map the DCA boot service to an Advanced Configuration and Power Interface (ACPI) runtime service. When the OS is subsequently booted, the DCA pre-boot method is reinitialized as an ACPI runtime service (referred to herein as a "DCA ACPI RT service").

When a VM or container is subsequently booted during OS runtime, the DCA ACPI runtime service may be executed to validate the certificate received from the VM/container during the pre-boot phase. If the certificate received during the pre-boot phase is successfully validated, the DCA ACPI runtime service programs the CPU cache bit MSRs to dynamically assign cache address line bits to the VM/container based on the VM/container application workload. In other words, the DCA ACPI runtime service may be executed to dynamically partition the shared cache memory based on VM/container application workload and map the dynamically created cache partitions to the individual VMs/containers by assigning a number of the page-sized cache namespaces to each VM/container. After the cache partitions are dynamically created and mapped to the VMs/containers, application namespace labels may be assigned to the page-sized cache namespaces to assign protected cache namespace(s) to each VM/container application and prevent other VMs/containers/applications from accessing the cache address line bits uniquely assigned to each application. If the VM/container later reduces cache utilization (e.g., when an application running on the VM/container is closed), the pages within the protected cache namespace may be released back into the cache namespace pool to be reassigned to other VM/container applications.

In some respects, the information handling systems and methods disclosed herein improve upon Intel's Cache Allocation Technology (CAT) by dynamically partitioning the shared cache memory based on VM/container application workload and mapping the dynamically created cache partitions to VMs/containers, instead of tagging static cache partitions to individual processing cores. In addition, the information handling systems and methods disclosed herein improve upon Intel's Cache Allocation Technology (CAT) by assigning protected cache namespaces to each VM/container application, in such a way that prevents other VMs/containers/threads/applications from accessing the cache address line bits uniquely assigned to that application. In doing so, the disclosed systems and methods optimize cache utilization, improve cache performance and eliminate cache security vulnerabilities typically associated with CAT.

Unlike Intel's Cache Allocation Technology (CAT), the information handling systems and methods described herein create cache namespaces that are page granular, and do not limit the number of cache partitions to four (or six) partitions. In some embodiments, the disclosed systems and methods may be used to create a number of cache partitions, or page-sized cache namespaces, which is limited only by the cache size and the page size. In one example implementation, a maximum limit on the number of cache partitions may be determined by dividing the size of the shared cache memory by the page size. For example, a maximum of 2046 cache partitions, or page-sized cache namespaces, may be created within an 8 MB cache. In some embodiments, the techniques described herein may be used to provide approximately 30% performance gain for an 8 MB cache. However, one skilled in the art would readily understand how even greater performance gains may be achieved when the techniques described herein are utilized within larger cache sizes (e.g., 10 MB, 12 MB, etc.)

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

Figure 4:
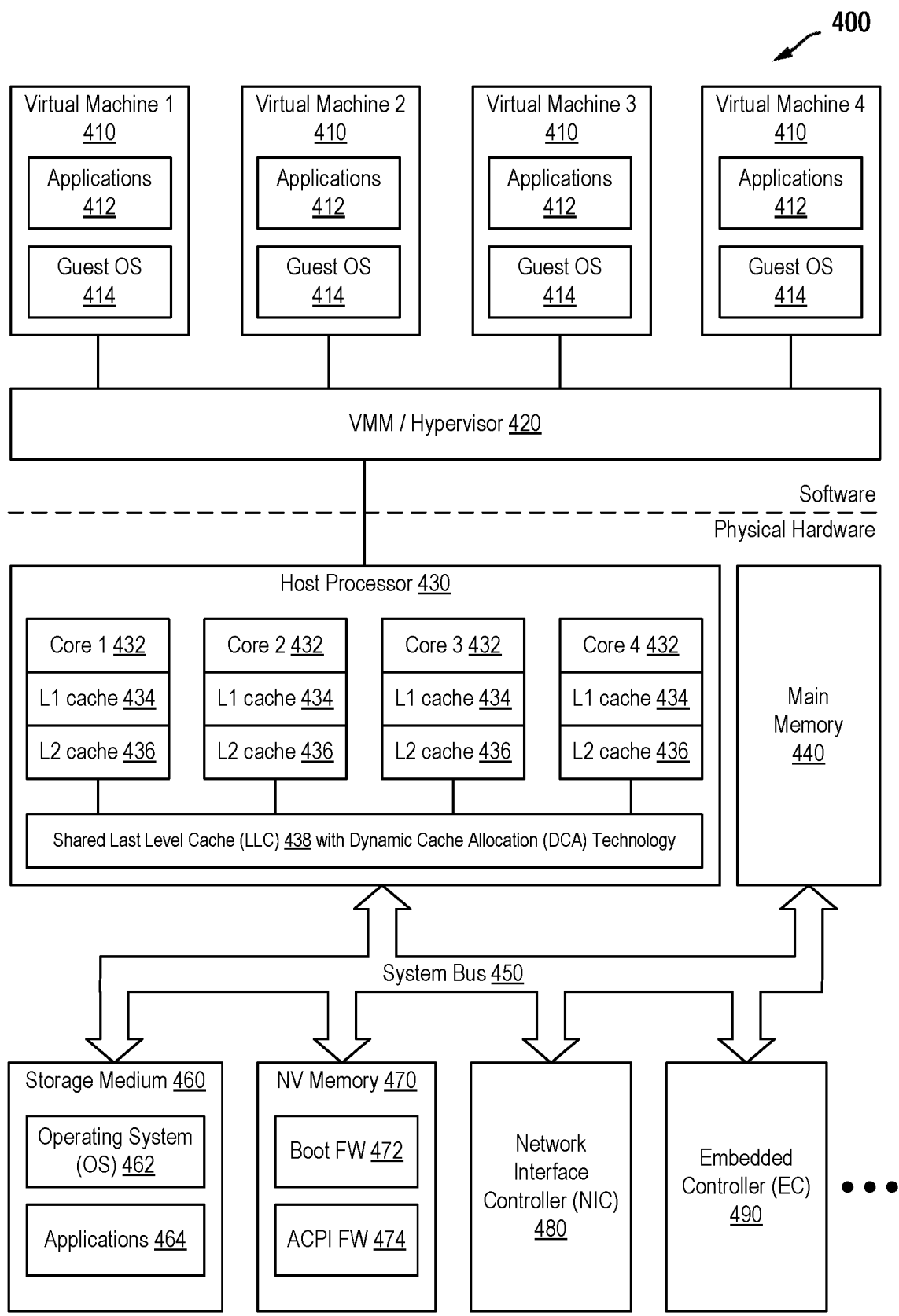
FIG. 4 is a block diagram illustrating various software and physical hardware components of a virtualized and/or containerized information handling system (IHS), which uses the techniques described herein to improve the security and performance of cache memory contained within a host processor.

FIG. 4 illustrates one embodiment of an information handling system (IHS) 400 that may utilize the techniques described herein to improve the security and performance of shared cache memory contained within a host processor. In the illustrated embodiment, IHS 400 is a virtualized information handling system that includes a software layer, which is abstracted from, yet shares resources within, the physical hardware components of the IHS. It will be understood that while certain software and physical hardware components of the virtualized IHS 400 are shown in FIG. 4 for illustrating embodiments of the present disclosure, the information handling system disclosed herein is not restricted to including only those components shown in FIG. 4 and described below. It will be further understood that the IHS configuration shown in FIG. 4 is exemplary only, and that the disclosed methods may be implemented on any virtualized and/or containerized information handling system having a multi-core host processor.

In the embodiment shown in FIG. 4, the software layer of virtualized IHS 400 includes four virtual machines 410 (e.g., VM 1, VM 2, VM 3 and VM 4) and a virtual machine manager (VMM) 420 (or hypervisor), which coordinates the VMs 410 and serves as an interface between the VMs 410 and the underlying physical hardware. Each VM 410 has its own guest operating system (OS) 412 and applications 414, which are executed by a different processing core 432 of the host processor 430. It is recognized that the virtualized system described herein is not limited to any particular number of virtual machines 410. In some embodiments, the number of virtual machines 410 may generally depend on the number of processors and/or processing cores included within the virtualized system. In other embodiments, one or more of the virtual machines 410 may be replaced with a container engine (such as, e.g., Docker) to provide a virtualized and/or containerized information handling system.

In the embodiment shown in FIG. 4, the physical hardware resources of virtualized IHS 400 includes, but is not limited to, a host processor 430, a memory controller (not shown) and a main memory 440, a system bus 450, at least one computer readable storage device 460, at least one non-volatile computer readable memory 470, a network interface controller (NIC) 480, and an embedded controller 490. It will be recognized that other physical hardware components may also be included within the virtualized IHS 400. For example, virtualized IHS 400 may also include a display device, a graphics processing unit (GPU), a platform controller hub (PCH), input/output (I/O) devices, etc.

Host processor 430 may include any processor or processing device capable of executing program instructions. For example, host processor 430 may include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). According to one embodiment, host processor 430 may be a central processing unit (CPU) having a plurality of processing cores 432 (e.g., 2, 4, 6, 8, etc., processing cores). In other embodiments, host processor 430 may include other types of processing devices including, but not limited to, a graphics processor unit (GPU), a graphics-derivative processor (such as a physics/gaming processor), a digital signal processor (DSP), etc.

In the embodiment shown in FIG. 4, host processor 430 is a multi-core processor having four processing cores 432 (e.g., Core 1, Core 2, Core 3 and Core 4). Each processing core 432 includes one or more dedicated higher-level caches, such as L1 cache 434 and L2 cache 436, for temporarily storing data and instructions to be executed by that processing core. In addition, host processor 430 includes a last level cache (LLC) 438, which is shared by all processing cores 432. Like other physical hardware resources, the LLC 438 may be divided amongst and shared between the plurality of VMs 410 (and/or containers) running on the individual processing cores 432.

Main memory 440 may be generally configured to store program instructions and/or data, which is accessible and executable by the host processor 430. Main memory 440 may otherwise be referred to as "system memory" or "physical memory." Main memory 440 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of persistent memory. In one embodiment, main memory 440 may include one or more dual in-line memory modules (DIMMs), each containing one or more RAM modules mounted onto an integrated circuit board.

Although not illustrated in FIG. 4, a memory controller may be coupled between the host processor 430 and the main memory 440 to manage the flow of program instructions and/or data there between according to the stored memory configuration settings (e.g., memory timing, driving voltage, etc.). In the embodiment shown in FIG. 4, a memory controller (not shown) may be coupled between the host processor 430 and the main memory 440 for transferring program instructions and/or data from the relatively slow main memory 440 into the last level cache (LLC) 438, which is shared by all processing cores 432. Once provided to the shared LLC 438, program instructions and/or data destined for a particular processor core 432 may propagate into the higher level caches (e.g., the L2 cache 436 and L1 cache 434) before being consumed by that processor core 432.

System bus 450 may communicatively couple various system components to the host processor 430 including, but not limited to, the main memory 440, the at least one computer readable storage device 460, the at least one non-volatile computer readable memory 470, the network interface controller 480, the embedded controller 490, etc., shown in FIG. 4. As such, the system bus 450 may represent a variety of suitable types of bus structures, such as e.g., a memory bus (or local bus) for connecting the main memory 440 to the host processor 430 or a peripheral bus (or expansion bus) for connecting various peripheral devices to the host processor 430, using various bus architectures. Example bus architectures may generally include, but are not limited to, a Micro Channel Architecture (MCA) bus, an Industry Standard Architecture (ISA) bus, an Enhanced ISA (EISA) bus, a Video Electronics Standards Association (VESA) local bus, a Personal Computer Memory Card Industry Association (PCMCIA) bus, an Accelerated Graphics Port (AGP) bus, a Small Computer Systems Interface (SCSI), a Universal Serial Bus (USB), a Peripheral Component Interconnect (PCI) bus, a PCI Express (PCIe) bus, a HyperTransport (HT) bus, etc.

The at least one computer readable storage medium 460 may be configured to store software and/or data and may be any type of persistent, non-transitory computer readable storage medium, such as one or more hard disk drives (HDDs) or solid-state drives (SSDs). In the illustrated embodiment, the at least one computer readable storage medium 460 is configured to store at least one operating system (OS) 462 for the IHS, in addition to one or more user applications 464 and (optionally) user data. OS 462 and application(s) 464 may contain program instructions, which may be executed by the host processor 430 to perform various tasks and functions for the information handling system and/or for the user.

The at least one computer readable memory 470 may be configured to store software and/or firmware modules, and may include any type of non-volatile memory including, but not limited to, read-only memory (ROM), flash memory, and non-volatile random access memory (NVRAM). The software and/or firmware modules stored within the at least one computer readable memory 470 may generally contain program instructions (or computer program code), which may be executed by the host processor 430 to instruct components of IHS 400 to perform various tasks and functions for the information handling system. In the embodiment shown in FIG. 4, the at least one computer readable memory 470 stores boot firmware (FW) 472 and Advanced Configuration and Power Interface (ACPI) firmware 474.

Network interface controller (NIC) 480 enables IHS 400 to communicate with one or more remotely located systems via an external network (not shown). NIC 480 may communicate data and signals to/from the remote system(s) via the external network using any known communication protocol or combination of communication protocols. For example, the network may be a local area network (LAN), wide area network (WAN), personal area network (PAN), or the like, and the connection to and/or between the IHS 400 and the network may be wired, wireless or a combination thereof. In some embodiments, the IHS 400 may utilize the NIC 480 to access virtual machines and/or containers running on a remote system operating in the cloud.

Embedded controller (EC) 490 may generally include read only memory (ROM), random access memory (RAM) and a processing device (e.g., a controller, microcontroller, microprocessor, ASIC, etc.) for executing program instructions stored within its internal ROM and RAM. In some embodiments, EC 490 may be configured to boot the information handling system and perform other functions. For example, EC 490 may store execute program instructions (e.g., a boot block) stored within its internal ROM to initiate a boot process for the information handling system.

When IHS 100 is powered on or rebooted, the processing device of EC 490 may initiate a boot process for the information handling system by executing the boot block stored within the EC ROM while the host processor 430 is in reset. As used herein, an IHS "boot process" is a process or set of operations performed by an information handling system component (e.g., EC 490 and/or host processor 430) to load and execute a boot system (e.g., BIOS and/or UEFI) and prepare the system for OS booting. When the host processor 430 comes out of reset, the host processor retrieves the boot firmware 472 from computer readable memory 470, stores a local copy of the boot firmware within main memory 440, and executes the boot firmware to configure hardware components of the IHS, perform a Power-On Self-Test (POST), discover and initialize devices, and launch a bootloader within boot firmware 472 to load OS 462. Once launched, the bootloader retrieves OS 462 from the computer readable storage medium 460 and loads it into main memory 440. Once the OS 462 is loaded and running, the host processor 430 may begin executing software contained within OS 462 to perform various functions for the IHS 400.

The boot firmware 472 stored within computer readable memory 470 may generally include software and/or firmware modules for specifying hardware configuration settings, system time and boot sequence, etc. Boot firmware 472 may include a Basic Input/Output System (BIOS) and/or a Unified Extensible Firmware Interface (UEFI). When IHS 400 is powered on or rebooted, program instructions within boot firmware 472 may be executed by the embedded controller 490 and/or the host processor 430 to configure hardware components of the IHS, perform a Power-On Self-Test (POST) to ensure the hardware configuration is valid and working properly, discover and initialize devices and launch a bootloader to boot OS 462. Once launched, the bootloader within boot firmware 472 retrieves OS 462 from computer readable storage medium 460 and loads it into main memory 440. Boot firmware 472 has control of the system platform during a pre-boot phase of the boot firmware, i.e., the duration of time between a system restart/reboot and the loading of OS 462. Once the OS is loaded and running, platform control shifts to the operating system (i.e., during OS runtime).

As known in the art, boot firmware 472 may generally include boot services and runtime services. Boot services are available for execution only when the boot firmware 472 owns the platform during the pre-boot phase of the boot firmware before the OS 462 is loaded and running. Examples of boot services typically provided within boot firmware 472 include, but are not limited to, text and graphical consoles, and bus, block and file services. Runtime services, on the other hand, are available for execution while the OS 462 is running (i.e., during OS runtime). Examples of runtime services typically provided within boot firmware 472 include, but are not limited to, date/time configuration settings and access to non-volatile memory.

When an information handling system initially powered on or rebooted, the host processor 430 executes memory reference code (MRC), as part of the boot firmware 472, to initialize memory components of the IHS (including main memory 440, L1 cache 434, L2 cache 436, LLC 438 and other memory components) during POST. The MRC includes memory configuration setting information (such as timing, driving voltage, etc.), which is configured by the MRC during the IHS boot process, and used to access the memory components during OS runtime. As described in more detail below, the memory reference code may include additional boot services (see, e.g., FIGS. 5 and 6), which may be executed to perform various steps of the methods disclosed herein. For example, the MRC may include various cache initialization methods, which may be used during the pre-boot phase of the boot firmware 472 to create page-size cache namespaces within the LLC 138, allocate memory to the CPU cache bit model-specific registers (MSRs) and map the cache initialization pre-boot service to an ACPI runtime service.

As noted above and shown in FIG. 4, ACPI firmware 474 may be stored within the at least one computer readable memory 470. ACPI is an open standard that operating systems can use to discover and configure computer hardware components and to perform power management, thermal management and status monitoring. The ACPI serves as an interface layer between the boot firmware 472 and the OS 462. As known in the art, the ACPI firmware 474 includes ACPI tables, ACPI BIOS and ACPI registers, and provides OS-independent interfaces between the platform hardware and OS-specific technologies, interfaces and code.

During the pre-boot phase of the boot firmware 472, the ACPI firmware 474 communicates available hardware components and their functions to OS 462 using methods provided by boot firmware 472 (UEFI or BIOS). In particular, the ACPI firmware 474 constructs all ACPI tables and populates the interfaces and handlers to be used during OS runtime. To construct the ACPI tables, ACPI firmware 474 uses boot services of boot firmware 472 to capture all hardware units and associated power components. The APCI tables are then used during OS runtime to provide ACPI runtime services to OS 462. As known in the art, the ACPI tables include hooks to all handlers where the ACPI runtime services are called. As set forth in more detail below, the ACPI firmware 474 may include additional runtime services (see, e.g., FIGS. 5 and 6), which may be executable to perform various steps of the methods disclosed herein.

Figure 5:
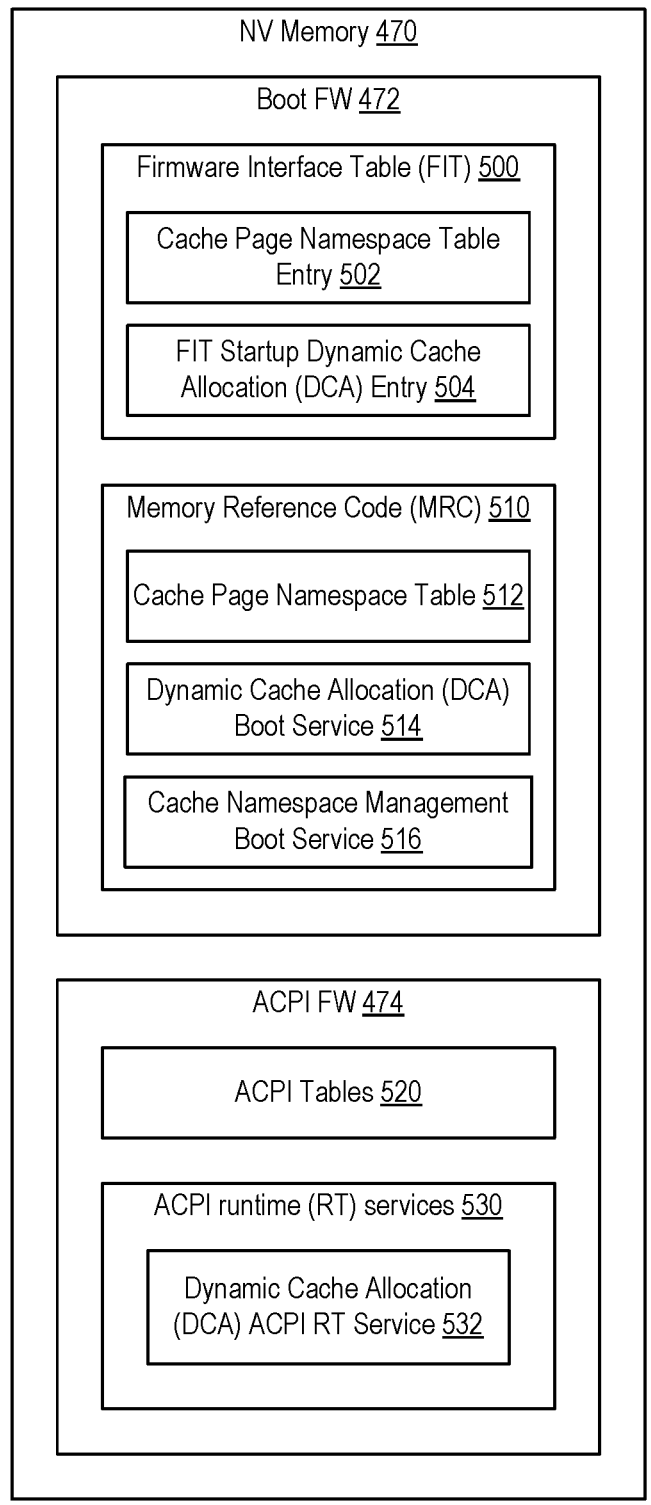
FIG. 5 is a block diagram illustrating various firmware components, which may be stored within the non-volatile computer readable memory shown in FIG. 4 and utilized to perform the techniques described herein.
Figure 6:
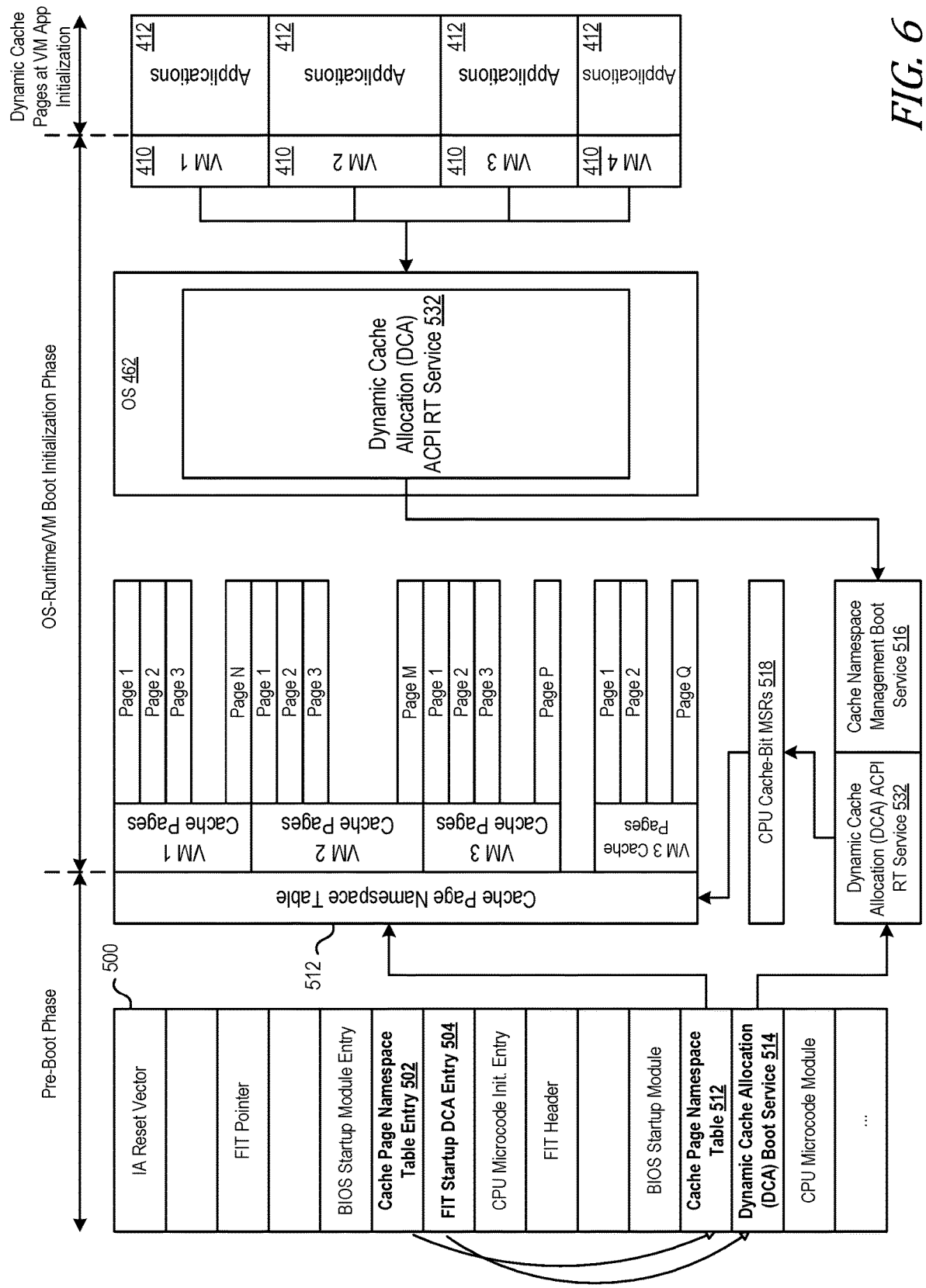
FIG. 6 is a functional block diagram illustrating how the firmware components shown in FIG. 5 may be used to perform the techniques described herein during various phases of IHS operation.

In the IHS 400 shown in FIG. 4, the security and performance of the last level cache (LLC) 438 is significantly improved by using MRC-based cache initialization methods to create page-sized cache namespaces within the last level cache during the pre-boot phase. When a virtualized and/or containerized application (such as, e.g., an application 412) is subsequently booted during OS runtime, ACPI runtime services are called and executed to create dynamic cache partitions, containing one or more page-sized cache namespaces, which are uniquely mapped to the virtualized/containerized application. FIGS. 5 and 6 illustrate example implementations of the MRC-based cache initialization methods and ACPI runtime services used herein to improve the security and performance of the last level cache (LLC) 438.

In some embodiments, the MRC-based cache initialization methods may be loaded via a firmware interface table (FIT) 500 included within the boot firmware 472, as shown in FIGS. 5 and 6. The FIT 500 is a data structure within the boot firmware 472 that contains pointers to one or more microcode updates. Loading a microcode update from the FIT 500 is the preferred way to load a microcode update in Intel platforms, because it helps to ensure that all update components are loaded at the earliest point in the boot process. Before executing the first instruction of the boot firmware 472 at the Intel® architecture (IA) reset vector, the host processor 430 processes the FIT 500 to locate a microcode update suitable for that host processor. If a suitable update is found, the host processor 430 loads the microcode update before the first instruction of the boot firmware 472 is fetched.

In some embodiments, the FIT 500 shown in FIGS. 5 and 6 may be used to load the MRC-based cache initialization methods described herein as an early BIOS microcode update before the memory reference code (MRC) 510 is executed to initialize memory components (e.g., main memory 440, L1 cache 434, L2 cache 436, LLC 438, etc.) included within the IHS 400. As shown in FIGS. 5 and 6, FIT 500 may include pointers to the cache initialization methods and associated tables contained within the MRC 510. For example, the FIT 500 may include a cache page namespace table entry 502, which points to a cache page namespace table 512 contained within the MRC 510. In addition, the FIT 500 may include a FIT Startup Dynamic Cache Allocation (DCA) entry 504, which points to a DCA boot service 514 contained within the MRC 510. The MRC 510 may also include a cache namespace management boot service 516, as shown in FIGS. 5 and 6.

During the early pre-boot phase (e.g., during the pre-boot phase shown in FIG. 6), host processor 430 processes the FIT 500 to load the DCA boot service 514 and the cache page namespace table 512 contained within the MRC 510. Once loaded, the DCA boot service 514 is executed by the host processor 430 to create page-sized cache namespaces within the LLC 438, initialize the page-sized cache namespaces within the cache page namespace table 512, and set the cache address line bits for page-level protected cache partitions. The number of page entries (or page-sized cache namespaces) included within the cache page namespace table 512 may generally depend on the size of the LLC 438 and the page size. In one embodiment, the number of page entries may be determined by dividing the cache size by the page size. In an 8 MB cache, the cache page namespace table 512 may include approximately 2046 page entries, for example.

Virtual machines 410 (and/or containers) may register for one or more of the page-sized cache namespaces included within the cache page namespace table 512 by providing certificates to the DCA boot service 514 during the pre-boot phase. The DCA boot service 514 stores the certificates received from the VMs/containers during the pre-boot phase, so that they can be validated during OS runtime. In addition, host processor 430 executes the cache namespace management boot service 516 during the pre-boot phase to allocate memory to the CPU cache bit model-specific registers (MSRs) 518 and map the DCA boot service 514 to an ACPI runtime service. When the OS 462 is subsequently booted, the DCA method is reinitialized as an ACPI runtime service (e.g., DCA ACPI RT service 532).

As shown in FIG. 5, ACPI firmware 474 may generally include ACPI tables 520 and ACPI runtime (RT) services 530 including, but not limited to, DCA ACPI RT service 532. When a virtual machine 410 (or container) is booted during OS runtime (e.g., during the OS runtime/VM boot initialization phase shown in FIG. 6), the DCA ACPI RT service 532 is called and executed by the host processor 430 to validate the certificate received from the VM/container during the pre-boot phase. If the certificate received during the pre-boot phase is successfully validated, the DCA ACPI RT service 532 programs the CPU cache bit MSRs 518 to dynamically assign cache address line bits to the VM/container based on the VM/container application workload. In one example, the DCA ACPI RT service 532 may program the CPU cache bit MSRs 518 to assign a greater number of cache address line bits, and thus a larger cache partition, to a VM/container having a larger application workload vs a VM/container having a smaller application workload. In another example, a greater number of cache address line bits (i.e., larger cache partition) may be assigned to VM(s)/container(s) running prioritized application(s).

Unlike Intel's Cache Allocation Technology (CAT), which uses capacity bitmasks (CBMs) to map static cache partitions to individual processing cores, the DCA ACPI RT service 532 dynamically partitions the shared LLC 438 based on VM/container application workload and maps the dynamically created cache partitions to the individual VMs/containers. In the embodiment shown in FIGS. 5 and 6, the DCA ACPI RT service 532 maps the dynamically created cache partitions to the VMs/containers by assigning a number of the page-sized cache namespaces included within the cache page namespace table 512 to each VM/container. In the embodiment shown in FIG. 6, for example, the DCA ACPI RT service 532 assigns N-number of the page-sized cache namespaces (pages 1-N) to VM 1, M-number of the page-sized cache namespaces (pages 1-M) to VM 2, P-number of the page-sized cache namespaces (pages 1-P) to VM 3 and Q-number of the page-sized cache namespaces (pages 1-Q) to VM 4, based on the application workload running on each virtual machine. Any number of page-sized cache namespaces may be assigned to the VMs/containers ranging from zero (0) to a maximum limited defined by the cache size divided by the page size.

After the dynamic cache partitions are created and mapped to the VMs/containers, the DCA ACPI RT service 532 may map page-sized cache namespace(s) to the VM/container applications by assigning application namespace labels to the page-sized cache namespaces included within the cache page namespace table 512. The application namespace labels protect the cache namespaces assigned to each VM/container application, and prevent other VMs/containers/applications from accessing the protected cache namespaces (and cache address line bits) uniquely assigned to that application. This is represented schematically in FIG. 7.

Figure 2:
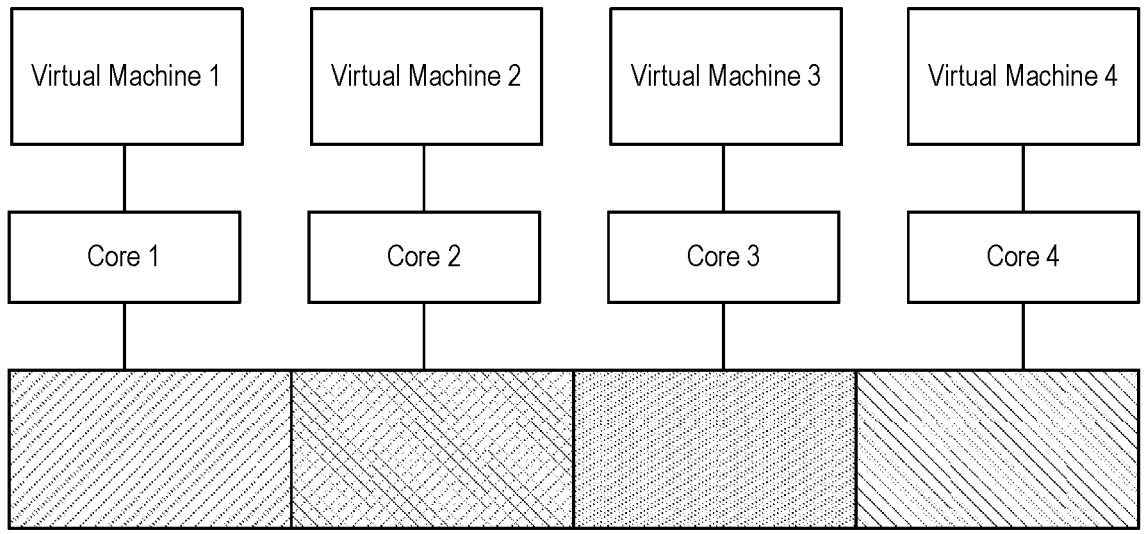
FIG. 2 (PRIOR ART) is a block diagram of a shared LLC with Intel's CAT, illustrating how the static cache partitions assigned by CAT are mapped to each processing core and VM.
Figure 3:
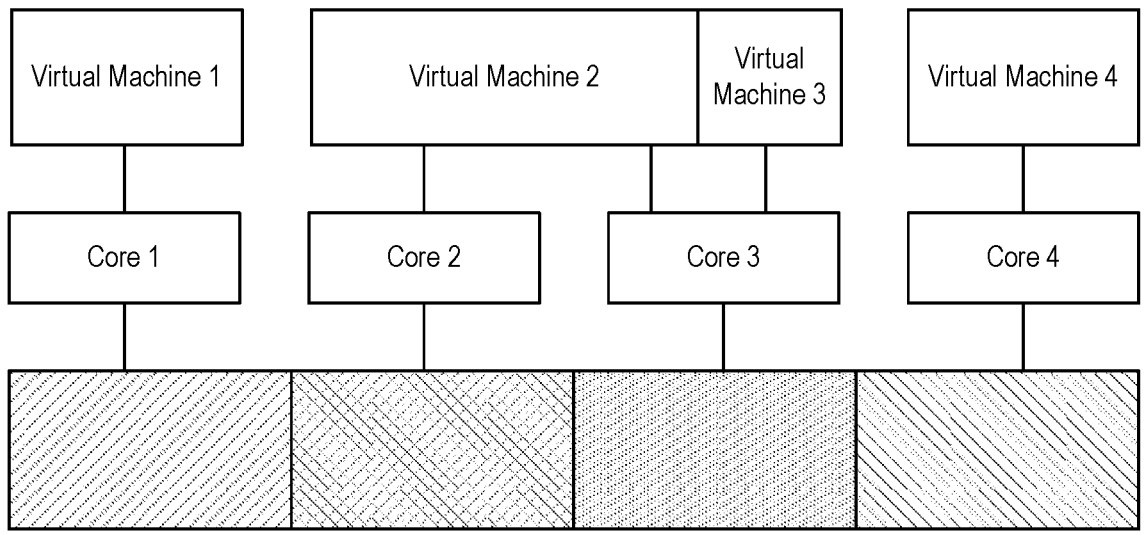
FIG. 3 (PRIOR ART) is a block diagram of a shared LLC with Intel's CAT, illustrating a security vulnerability that arises with VM core sharing.
Figure 7:
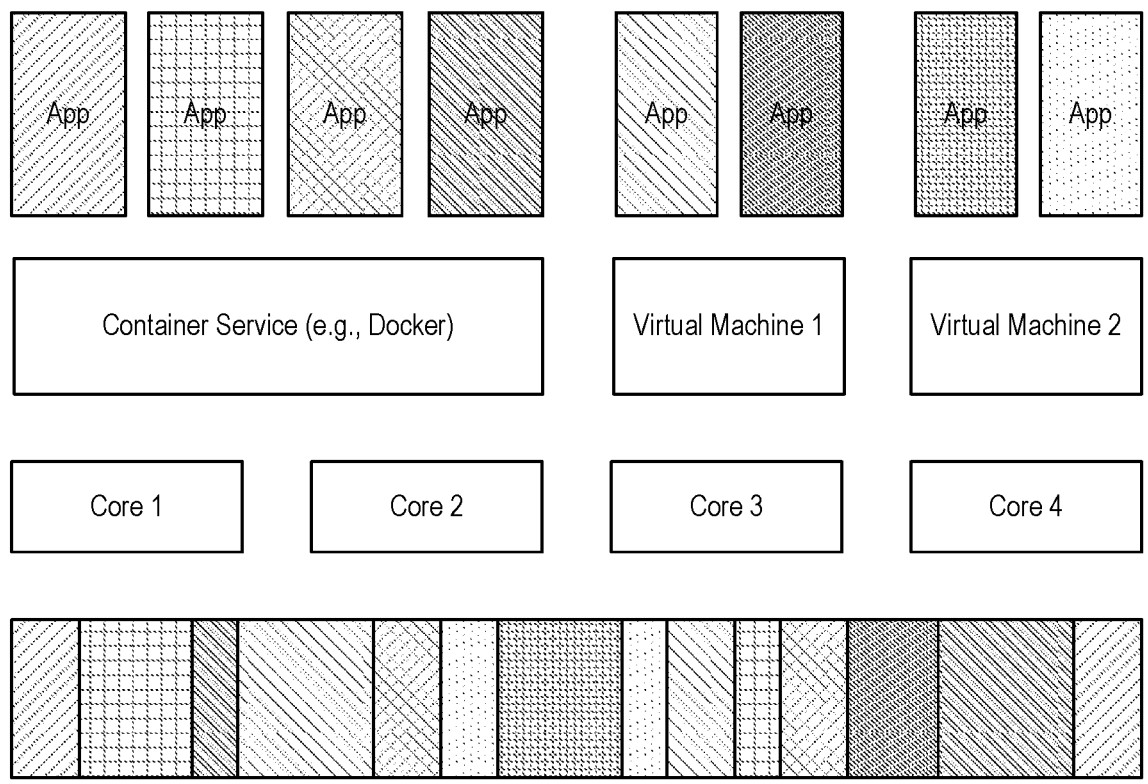
FIG. 7 is a block diagram of a shared cache memory, illustrating how the techniques disclosed herein may be used to dynamically partition the shared cache memory based on VM/container application workload and provide protected cache access to VM/container applications.

FIG. 7 is a block diagram of a shared cache memory (e.g., shared LLC 438), illustrating how the techniques disclosed herein may be used to dynamically partition the shared cache memory based on VM/container application workload and provide protected cache access to VM/container applications. Unlike the prior art embodiments shown in FIGS. 2 and 3, static cache partitions are not mapped to the individual processing cores (e.g., Core 1, Core 2, Core 3, Core 4) in the embodiment shown in FIG. 7. Instead, the shared cache memory is dynamically partitioned based on VM/container application workload, and each VM/container application (App) is assigned its own protected cache namespaces, which cannot be accessed by other VMs/containers, or even other applications running on the same VM/container. If a VM/container subsequently reduces cache utilization (e.g., when an application running on the VM/container is closed), the pages within the protected cache namespace may be released back into the cache page namespace table 512 to be reassigned to other VM/container applications.

Figure 8:
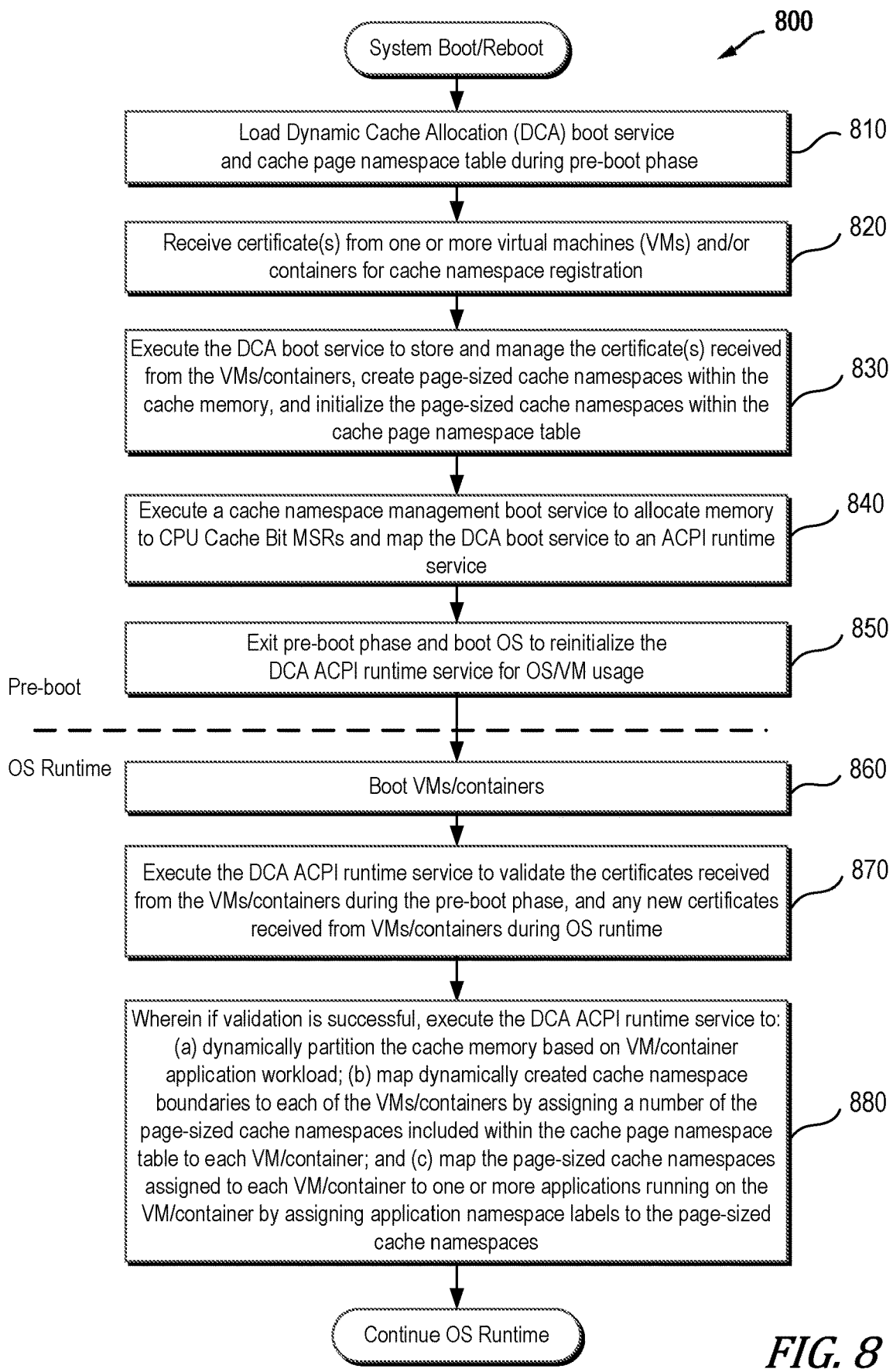
FIG. 8 is a flow diagram illustrating one embodiment of a computer implemented method that utilizes the techniques described herein to improve the security and performance of a shared cache memory contained within a host processor included within an IHS.

FIG. 8 illustrates one embodiment of a method 800 that utilizes the techniques described herein to improve the security and performance of a shared cache memory contained within a host processor included within an information handling system (IHS), such as IHS 400. The host processor may generally include a plurality of processing cores for running virtual machines (VMs) and/or containers, and the cache memory may be shared by each of the processing cores. The method 800 shown in FIG. 8 is a computer implemented method performed, at least in part, by execution of program instructions stored within a computer readable memory of the IHS. For example, the computer implemented method 800 may be performed by host processor 430 executing program instructions contained within boot firmware 472 and ACPI firmware 474. Some of the method steps shown in FIG. 8 (e.g., steps 810-850) are performed by boot services during the pre-boot phase of the boot firmware (i.e., before the operating system is booted), while other method steps (e.g., steps 860-880) are performed by ACPI runtime services during OS runtime (i.e., after the operating system finishes booting).

The computer implemented method 800 shown in FIG. 8 improves the way in which IHS 400 functions, in at least some respects, by dynamically partitioning the shared cache memory based on VM/container application workload and mapping protected cache namespaces to the VM/container applications, instead of the processor/processing cores executing the applications. Although described herein in the context of a shared last level cache, such as LLC 438, the computer implemented method 800 shown in FIG. 8 may be used to dynamically partition and map any shared cache memory. A skilled artisan having benefit of this disclosure may recognize other ways in which the computer implemented method described herein may be used to improve the functioning of an information handling system, such as IHS 400.

It will be recognized that the embodiment shown in FIG. 8 is merely exemplary and additional methods may utilize the techniques described herein. Further, additional steps may be added to the method shown in the FIG. 8 as the steps described are not intended to be exclusive. Moreover, the order of the steps is not limited to the order shown in FIG. 8 as different orders may occur and/or various steps may be performed in combination or at the same time.

As shown in FIG. 8, method 800 may begin during the pre-boot phase when an information handling system (such as IHS 400) is booted or rebooted. For example, method 800 may begin (in step 810) by loading a first boot service (e.g., DCA boot service 514) and a cache page namespace table (e.g., cache page namespace table 512) during the pre-boot phase. In some embodiments, the first boot service and the cache page namespace table may be stored within the memory reference code (MRC) of the boot firmware, and may be loaded (in step 810) via a firmware interface table (FIT). The method 800 may also receive certificate(s) from one or more virtual machines (VMs) and/or containers for cache namespace registration (in step 820) during the pre-boot phase.

Once loaded, the first boot service may be executed by a processing device (e.g., host processor 430) of the information handling system (in step 830) to store and manage the certificate(s) received from the VMs/containers, create page-sized cache namespaces within the shared cache memory, and initialize the page-sized cache namespaces within the cache page namespace table. In addition, a second boot service (e.g., cache namespace management boot service 516) may be executed by the processing device (in step 840) to allocate memory to the CPU cache bit MSRs and map the first boot service to an ACPI runtime service (e.g., DCA ACPI RT service 532). In step 850, the method 800 may exit the pre-boot phase and boot the operating system (OS) to reinitialize the ACPI runtime service for OS/VM usage.

When VMs/containers are booted during OS runtime (in step 860), the ACPI runtime service may be called and executed by the processing device to validate the certificates received from the VMs/containers during the pre-boot phase (in step 870). In some embodiments, the ACPI runtime service may also validate any new certificates that may be received from VMs/containers during OS runtime (in step 870).

If the certificates received from the VMs/containers are successfully validated (in step 870), the ACPI runtime service may be further executed by the processing device (in step 880) to: (a) dynamically partition the shared cache memory based on VM/container application workload; (b) map the dynamically created cache partitions to each of the validated VMs/containers by assigning a number of the page-sized cache namespaces included within the cache page namespace table to each VM/container; and (c) map the page-sized cache namespaces assigned to each VM/container to one or more applications running on the VM/container by assigning application namespace labels to the page-sized cache namespaces. If a particular VM/container subsequently reduces cache utilization (e.g., when an application running on the VM/container is closed), the pages within the protected cache namespace may be released back into the cache page namespace table to be reassigned to other VM/container applications.

As discussed above in reference to FIGS. 4-8, the techniques described herein optimize cache utilization, improve cache performance and eliminate security vulnerabilities of a shared cache memory (such as, e.g., shared LLC 438) by creating dynamic cache partitions, which are mapped to virtual machines and/or containers based on application workload, and uniquely mapping protected cache namespaces included within the cache partitions to the applications running on each VM/container. In other words, the disclosed techniques optimize cache utilization and improve cache performance by dynamically partitioning a shared cache memory based on the needs of the applications running on the individual VMs/containers, and by distributing and redistributing the dynamically created cache partitions to the individual VMs/containers based on need.

Because the techniques described herein partition the shared cache memory and distribute cache partitions to VMs/containers based on application usage, VMs/containers are provided only with the number of cache pages needed to run their own applications, and no cache pages are assigned to VMs/containers and left unused. When a VM/container reduces cache utilization, one or more of the cache pages assigned to the VM/container may be released back into the cache namespace pool, so that they may be reassigned to other VMs/containers. This represents a significant improvement in cache utilization and performances compared to prior art techniques. In some embodiments, the disclosed techniques may also be used to prevent the "noisy neighbor" problem in multi-tenant VMs/containers by providing larger cache partitions to VMs/containers running prioritized applications.

In addition to optimizing cache utilization and improving cache performance, the techniques described herein eliminates security vulnerabilities commonly seen in shared cache memory (such as the shared LLC 138 shown in FIG. 1) by dynamically assigning protected cache namespace labels to each VM/container application, so that other VMs/containers/threads/applications are prevented from accessing the cache address line bits uniquely assigned to each application. In doing so, the techniques described herein may prevent one virtual machine from accessing unencrypted data stored in the shared cache memory (e.g., LLC 438) by another virtual machine, and may also prevent cross-VM side channel attacks against the shared cache memory. A skilled artisan having benefit of this disclosure may recognize other ways in which the techniques described herein may be used to improve the security and/or performance of a shared cache memory.

It will be understood that one or more of the tasks, functions, or methodologies described herein may be implemented, for example, as firmware or as a computer program of instructions, which are embodied in a non-transitory tangible computer readable medium and executed by one or more processing devices. The computer program of instructions may generally include an ordered listing of executable instructions for implementing logical functions within the IHS, or within a component thereof. The executable instructions may include a plurality of code segments operable to instruct components of the information handling system to perform the methodologies disclosed herein. It will also be understood that one or more steps of the present methodologies may be employed in one or more code segments of a computer program. For example, a code segment executed by the information handling system may include one or more steps of the disclosed methodologies.

It will be understood that one or more processing devices may be configured to execute or otherwise be programmed with software, firmware, logic, and/or other program instructions, which are stored within one or more non-transitory tangible computer-readable mediums to perform the operations, tasks, functions, or actions described herein for the disclosed embodiments. The one or more processing devices may include, e.g., a central processing unit (CPU), controller, microcontroller, processor, microprocessor, field programmable gate array (FPGA), application specific integrated circuit (ASIC), or other suitable processing device. The one or more non-transitory tangible computer-readable mediums may include, e.g., data storage devices, flash memories, random update memories, read only memories, programmable memory devices, reprogrammable storage devices, hard drives, floppy disks, DVDs, CD-ROMs, and/or any other tangible data storage mediums.

While the present disclosure may be adaptable to various modifications and alternative forms, specific embodiments have been shown by way of example and described herein. However, it should be understood that the present disclosure is not intended to be limited to the particular forms disclosed. Rather, the present disclosure is to cover all modifications, equivalents, and alternatives falling within the spirit and scope of the present disclosure as defined by the appended claims. Moreover, the different aspects of the disclosed information handling systems and methods may be utilized in various combinations and/or independently. Thus, the present disclosure is not limited to only those combinations shown herein, but rather may include other combinations.

What is claimed is:

1. An information handling system (IHS), comprising:
a computer readable storage medium storing an operating system (OS);
a computer readable memory storing boot firmware and Advanced Configuration and Power Interface (ACPI) firmware, wherein the boot firmware includes boot services that are executable during a pre-boot phase of the boot firmware, and wherein the ACPI firmware includes an ACPI runtime service that is executable during OS runtime; and
a host processor coupled to the computer readable storage medium and to the computer readable memory, the host processor comprising a plurality of processing cores for running virtual machines (VMs) and/or containers, and a cache memory which is shared by the plurality of processing cores;
wherein during the pre-boot phase of the boot firmware, the host processor executes a first boot service to create page-sized cache namespaces within the cache memory and initialize the page-sized cache namespaces within a cache page namespace table; and
wherein during OS runtime, the host processor executes the ACPI runtime service to dynamically partition the cache memory based on VM/container application workload and map dynamically created cache partitions to the VMs/containers by assigning a number of the page-sized cache namespaces included within the cache page namespace table to each VM/container.

2. The information handling system as recited in claim 1, wherein the ACPI runtime service is further executed by the host processor to map the page-sized cache namespaces assigned to each VM/container to one or more applications running on the VM/container by assigning application namespace labels to the page-sized cache namespaces.

3. The information handling system as recited in claim 2, wherein the application namespace labels protect the page-sized cache namespaces assigned to each VM/container application, and prevent other VMs, containers or applications from accessing the protected page-sized cache namespaces assigned to that VM/container application.

4. The information handling system as recited in claim 1, wherein during the pre-boot phase, the VMs/containers register for one or more of the page-sized cache namespaces included within the cache page namespace table by providing certificates to the first boot service.

5. The information handling system as recited in claim 4, wherein the first boot service is further executed by the host processor to store and manage the certificates received from the VMs/containers during the pre-boot phase.

6. The information handling system as recited in claim 4, wherein during OS runtime, the host processor executes the ACPI runtime service to validate the certificates received from the VMs/containers during the pre-boot phase, and wherein the ACPI runtime service assigns one or more of the page-sized cache namespaces to a given VM/container only if the certificate received from the given VM/container is validated by the ACPI runtime service.

7. The information handling system as recited in claim 1, wherein the host processor further comprises cache bit model-specific registers (MSRs), and wherein during the pre-boot phase, the host processor executes a second boot service to allocate memory to the cache bit MSRs and map the first boot service to the ACPI runtime service.

8. The information handling system as recited in claim 7, wherein when the VMs/containers are booted during OS runtime, the ACPI runtime service is called and executed by the host processor to:
  validate certificates received from the VMs/containers during the pre-boot phase; and
  program the cache bit MSRs to dynamically assign cache address line bits to the VMs/containers based on the VM/container application workload, if the certificates received from the VMs/containers during the pre-boot phase are validated.

9. The information handling system as recited in claim 8, wherein the ACPI runtime service is executed by the host processor to program the cache bit MSRs, so as to assign a greater number of the cache address line bits to a VM/container having a larger application workload than a VM/container having a smaller application workload.

10. The information handling system as recited in claim 8, wherein the ACPI runtime service is executed by the host processor to program the cache bit MSRs, so as to assign a greater number of the cache address line bits to a VM/container running a prioritized application.

11. The information handling system as recited in claim 1, wherein the boot firmware further comprises a firmware interface table (FIT) and memory reference code (MRC), and wherein during the pre-boot phase, the host processor processes the FIT to locate and load the first boot service and the cache page namespace table stored within the MRC.

12. A computer implemented method to improve the security and performance of a cache memory contained within a host processor included within an information handling system (IHS), wherein the host processor includes a plurality of processing cores for running virtual machines (VMs) and/or containers, wherein the cache memory is shared by the plurality of processing cores, wherein the computer implemented method is performed, at least in part, by the host processor executing program instructions stored within a computer readable memory of the IHS, and wherein the computer implemented method comprises:
  executing program instructions within a first boot service during a pre-boot phase before an operating system (OS) of the IHS is loaded and running to create page-sized cache namespaces within the cache memory and initialize the page-sized cache namespaces within a cache page namespace table; and
  executing program instructions within an Advanced Configuration and Power Interface (ACPI) runtime service during OS runtime to dynamically partition the cache memory based on VM/container application workload and map dynamically created cache partitions to the VMs/containers by assigning a number of the page-sized cache namespaces included within the cache page namespace table to each VM/container.

13. The computer implemented method as recited in claim 12, wherein prior to executing the program instructions within the first boot service, the method further comprises processing a firmware interface table (FIT) during the pre-boot phase to locate and load the first boot service and the cache page namespace table stored within a memory reference code (MRC).

14. The computer implemented method as recited in claim 12, further comprising executing the ACPI runtime service during OS runtime to map the page-sized cache namespaces assigned to each VM/container to one or more applications running on the VM/container by assigning application namespace labels to the page-sized cache namespaces.

15. The computer implemented method as recited in claim 14, wherein the application namespace labels protect the page-sized cache namespaces assigned to each VM/container application, and prevent other VMs, containers or applications from accessing the protected page-sized cache namespaces assigned to that VM/container application.

16. The computer implemented method as recited in claim 14, wherein if a given VM/container subsequently reduces cache utilization by closing an application running on the given VM/container, the computer implemented method further comprises releasing the page-sized cache namespaces mapped to the application back into the cache page namespace table to be reassigned to other VM/container applications.

17. The computer implemented method as recited in claim 12, wherein during the pre-boot phase, the computer implemented method further comprises receiving certificates from one or more of the VMs/containers for cache namespace registration.

18. The computer implemented method as recited in claim 17, further comprising executing the program instructions within the ACPI runtime service during OS runtime to validate the certificates received from the one or more VMs/containers during the pre-boot phase.

19. The computer implemented method as recited in claim 18, wherein if the certificates received from the one or more VMs/containers are validated, the computer implemented method executes the program instructions within the ACPI runtime service during OS runtime to dynamically partition the cache memory based on the VM/container application workload and map the dynamically created cache partitions to each of the VMs/containers by assigning the number of the page-sized cache namespaces included within the cache page namespace table to each VM/container.

20. The computer implemented method as recited in claim 19, wherein if the certificates received from the one or more VMs/containers are validated, the computer implemented method further executes the program instructions within the ACPI runtime service during OS runtime to map the page-sized cache namespaces assigned to each VM/container to one or more applications running on the VM/container by assigning application namespace labels to the page-sized cache namespaces.

* * * * *